US005663425A

United States Patent [19]

Detroit et al.

[11] Patent Number: 5,663,425
[45] Date of Patent: Sep. 2, 1997

[54] PRODUCTION OF ACID SOLUBLE HUMATES

[75] Inventors: William J. Detroit; Stuart E. Lebo, Jr.; Lori L. Bushar, all of Schofield, Wis.

[73] Assignee: LignoTech USA, Inc., Rothschild, Wis.

[21] Appl. No.: 592,270

[22] Filed: Jan. 26, 1996

[51] Int. Cl.$^6$ .................................................. C07G 1/00
[52] U.S. Cl. ........................................................ 562/32
[58] Field of Search ............................................ 562/32

[56] References Cited

U.S. PATENT DOCUMENTS

| 3,700,728 | 10/1972 | Moschopedis et al. | 562/32 |
|---|---|---|---|
| 4,319,041 | 3/1982 | Goff | 562/475 |
| 4,842,770 | 6/1989 | Patel | 252/8.514 |
| 4,912,256 | 3/1990 | Cronje | 562/465 |
| 5,004,831 | 4/1991 | Dekker et al. | 562/475 |

OTHER PUBLICATIONS

Yaghmaie et al, Coal–Water Slurries of Low Viscosity, Chemical Abstracts, vol. 102, 1985, p. 156.
Zhambal, Composition and Structural Features of Sufohumic Acids, 51–Fossil Fuels, vol. 115, 1991, p. 139453.
Sharanova, Determination of the Amount and Form of Sulfur in Sulfonated Humates, 51 Fossil Fuels, vol. 107, 1987, p. 99563.
Olle Otero et al, Sulfited and Sulfonated Derivatives of Humic Acid and the Like, 19–Fert. Soils, Plant Nutr., vol. 96, 1982, p. 84643.
Pobedonostseva et al, Nonfuel Coal Processing, Chemical Abstracts, vol. 90, 1979, p. 106702.
Humic Acids, The Merck Index, Eleventh Edition, 1989, p. 4675.

*Primary Examiner*—Samuel Barts
*Attorney, Agent, or Firm*—Andrus, Sceales, Starke & Sawall

[57] ABSTRACT

A method is disclosed for production of acid soluble humates. Humic acid bearing ores are sulfoalkylated under alkaline conditions to produce high solids humic acid concentrates which are soluble at pH as low as 0.5 and in yields of at least 70 percent.

20 Claims, No Drawings

PRODUCTION OF ACID SOLUBLE HUMATES

BACKGROUND OF THE INVENTION

This invention relates to the production of acid soluble humic acids by sulfoalkylation of humic acid bearing ores. Production by the sulfoalkylation process described herein gives humic acids which have better solubility in acid systems and which are different from humic acids produced by earlier processes.

One such earlier process for producing humic acids is described in U.S. Pat. No. 5,004,831. The process involves mixing oxidized coal with aqueous alkali, heating the mixture to 100° to 180° C. under sufficient pressure to prevent evaporation of water, and maintaining the elevated temperature for a time sufficient to extract a substantial amount of the available humic acids. While this process produces humic acids in high yields, the humic acids thus produced are not sulfomethylated and have poor acid solubility.

The process disclosed herein also produces humic acids which are superior to those produced by traditional methods. These traditional methods for producing humic acids from humic acid bearing ores involve extraction with alkali. An example of such an extraction process is described in U.S. Pat. No. 4,319,041. It involves mixing humic acid containing ores with water and caustic soda and extraction of the humic acids by agitation at pH 6.5–8.0. The times required in this process are quite lengthy, however, and the humic acids produced are not acid soluble.

A method for producing sulfonated humic acids is described in U.S. Pat. No. 4,502,868. In it, $SO_2$ is used as the sulfonating agent. The sulfonated humic acid salts produced are claimed to be good viscosity reducers for coal water slurries. Under the conditions employed in the process, however, sulfonation is not sufficient to give solubility in low pH fertilizers.

Zhambal (Khim Tverd. Tolp. (Moscow) 1991, (2), 70–2) has also shown that humic acids can be sulfonated by reaction with concentrated sulfuric acids. During this process, however, the material is not solubilized in the acid. Thus the products formed would not have good solubility in low pH fertilizers.

A third method for sulfonating humic acids is described by Sharanova et al (Khim Tverd. Topl. (Moscow) 1987, (3), 38–43). In this method sulfonation is achieved by reaction of humic acids with sodium sulfite. However, since the products produced in the reaction are isolated by precipitation in dilute acid, it is clear that this method does not sulfonate sufficiently for solubility in low pH fertilizers.

Similarly, a method for producing sulfonated humic acids by reaction of humic acid bearing ores at low pH with a mixture of sodium sulfite and sodium bisulfite is described in Spanish Patent ES 495,426. Like the products described above, however, the products produced by this method can be isolated by precipitation in strong acids, and therefore, would have poor solubility in low pH fertilizers.

Pobedonostseva, et al (Khim. Tverd. Topl. (Moscow) 1978, (6), 97–102) describes a two step process for producing sulfomethylated lignite drilling mud thinners. In this process, humic acid is extracted from brown coals with alkali, and the resulting humic acids are sulfomethylated to make the final drilling mud thinners. While sulfomethylated humic acids are produced in the process, two separate steps are required. Additionally, there is no mention given to the levels of sulfonation required for solubility of the humic acids in acid fertilizers.

SUMMARY OF THE INVENTION

The present invention is a simple process for producing acid soluble humates. The process of the invention comprises sulfoalkylating humic acid bearing ores to produce sulfoalkylated humic acid concentrates which are soluble at pH as low as 0.5 and which are formed in yields of at least 70%.

The process, particularly, calls for reacting a humic acid bearing ore such as leonardite with formaldehyde and a sulfoalkylating agent such as sodium, potassium or ammonium bisulfite and/or meta-bisulfite after adjusting the pH of the reaction mixture to pH 9–12 with an alkali. The reaction takes place under conditions of temperature and pressure and for sufficient time to produce a sulfoalkylated humic acid concentrate. Preferably, the process utilizes sodium bisulfite and/or sodium meta-bisulfite as the sulfonating agent and is reacted at a pH of 10–11 and at temperature of 110°–170° C. for 1–2 hours. Removal of insolubles by filtration, centrifugation or settling gives a sulfoalkylated humic acid concentrate which is soluble at pH 0.5 or lower in yields of at least 75%. If desired, the humic acid concentrate may further be spray dried to form a powder.

The process described herein produces sulfoalkylated humic acids in good yield from humic acid containing ores. One important feature of the invention is that the sulfoalkylated humic acids produced in the process have good solubility in acid solutions and in complex, low pH fertilizer solutions. Another advantage is that the sulfoalkylated humic acids produced in the process are isolated either as a liquid concentrate or as a dried powder. A third advantage of the process is that it is rapid and easy.

DETAILED DESCRIPTION OF THE PREFERRED EMBODIMENT

According to the invention, a process for producing sulfoalkylated humic acid concentrates includes the steps of (a) mixing a humic acid containing ore with formaldehyde and a sulfonating agent to form a slurry; (b) adjusting the pH of the slurry to pH 9–12 to form a reaction mixture; (c) reacting the pH adjusted reaction mixture under conditions of temperature and pressure and for sufficient time to produce a sulfoalkylated humic acid concentrate; and (d) separating the sulfoalkylated humic acid concentrate from the reaction mixture. The liquid concentrate obtained by the process may further be formed into a powder, preferably by spray drying, if desired.

As used in this specification the term "humic acid containing ore" is defined as including lignites (especially leonardite), brown coals and peats, as well as artificial humic acids such as the products of the oxidative polymerization of quinones. The preferred ore is leonardite due to its ready availability and relatively inexpensive cost. The mean particle size of the ore will normally be less than about 3 mm. Preferably, the mean particle size of the ore varies in the range of 10 to 1000 microns and most preferably, the mean particle size is in the range of 10 to 100 microns. Thus, finer particles of ore result in the reaction occurring with relative ease enabling the reaction to be completed in a relatively shorter period of time.

The sulfonating agent employed is any sulfur containing compound which permits sulfoalkylation of humic acid bearing ores. The preferred sulfonating agents are sodium bisulfite, potassium bisulfite, ammonium bisulfite, magnesium bisulfite, sodium meta-bisulfite, potassium meta-bisulfite, ammonium meta-bisulfite and magnesium meta-bisulfite. Most preferably, sodium bisulfite or sodium meta-bisulfite is employed as the sulfonating agent. These two compounds are preferred as they both form an adduct with formaldehyde to permit a higher level of sulfonation of the humic acid bearing ore to provide better solubility in acid systems below pH 2.0.

The adduct formed is preferably formed with an aldehyde. The preferred aldehyde is formaldehyde as formaldehyde readily forms an adduct with sodium bisulfite or sodium meta-bisulfite to result in increasing sulfonation at sites on the humic acid bearing ore. Although formaldehyde is preferred, other aldehydes may be employed such as acetaldehyde, propionaldehyde and butyl aldehyde (although the yields will be less than those obtained with formaldehyde).

The second step of the process of the invention involves adjusting the pH of the slurry to pH 9–12. Preferably, the pH is adjusted to 10–11 by adding an alkali to the slurry. Any alkali may be employed that provides sufficient alkalinity to adjust the pH high enough as described above. Examples of alkali that may be used for pH adjustment of the slurry include sodium hydroxide, potassium hydroxide, ammonium hydroxide, lithium hydroxide, sodium carbonate, potassium carbonate, lithium carbonate and mixtures thereof. Most preferably, sodium hydroxide is used to adjust the pH of the slurry to form a reaction mixture. It should be noted that calcium hydroxide probably should not be employed to adjust the pH of the slurry since it will form an insoluble component.

The third step of the process involves reacting the pH adjusted mixture under conditions of temperature and pressure and for sufficient time to produce a sulfoalkylated humic acid concentrate. The reaction is preferably carried out in a pressurized closed vessel equipped with a suitable distributor or stirring mechanism to insure effective mass and heat transfer between the liquid and solid phases contained therein. A closed vessel should be rated at 2–1000 psi, preferably 2–400 psi to prevent evaporation of water. The reaction takes place at a temperature of between about 100°–210° C. Preferably, the reaction temperature ranges between 140°–190° C. and most preferably between 160°–170° C. The mixture is reacted for 0.5–5 hours with the preferred reaction time being 1.5–2 hours depending upon the reaction temperature and the particle size of the ore. In any event, the reaction step is continued for a period of time sufficient to produce a sulfoalkylated humic acid concentrate in yields of at least 75%. These sulfoalkylated humic acid concentrates are soluble at pH 2.0 or lower, preferably 0.5 or lower.

After the reaction is complete the sulfoalkylated humic acid concentrate is separated from the reaction mixture. Removal of insolubles may be accomplished by filtration, centrifugation or settling, or any other method commonly employed for separating insolubles from an aqueous medium.

EXAMPLE 1

The above features and advantages of the invention are accomplished according to the preferred embodiment by mixing humic acid containing ores such as leonardite with a minimum of 16% (w:w) formaldehyde and 33% (w:w) sodium meta-bisulfite, adjusting the pH of said mixture to 10–11 with sodium hydroxide and reacting the pH adjusted mixture at 160° C. for 90 minutes under sufficient pressure to prevent evaporation of water. The preferred solids content of the mixture during this process is 25% by weight. After reaction, the undissolved solids present in the mixture are separated from the sulfoalkylated humic acid solution by filtration, settling and/or centrifugation. Upon completion of the process, a liquid product is formed which is a minimum of 20% sulfoalkylated humic acid in aqueous solution. The pH of said product is between 9.0 and 10.0, the sulfonic sulfur content is greater than 5%, the viscosity is 60 cps and the precipitation pH (i.e. the pH at which the material becomes insoluble and forms a precipitate) is below pH 0.5.

It is apparent from the above example that the process of this invention is a simple and relatively inexpensive process for producing acid soluble humic acid concentrates. A second advantage of the process is that it produces high solids solutions which hive low viscosities. A third advantage of the process is that conditions can be varied so as to control the extent of sulfoalkylation and, hence, solubility.

EXAMPLE 2

As an example of this third advantage, the data in Table 1 show how formaldehyde and sodium meta-bisulfite concentrations can be varied to produce humic acid concentrates with varying degrees of sulfonation, and hence, precipitation pH. The data in Table 1 also show that yields for the process disclosed herein are comparable to those obtained via traditional processes. Data presented in Table 2 show how solubility in complex, low pH fertilizers is related to the sulfonic sulfur contents of the humic acids..The numbers set forth under the identification of the two fertilizers tested indicate the % nitrogen, % phosphorus, % potassium, and % sulfur, respectively, contained therein. The data in Table 2 clearly show that high sulfonic sulfur contents (i.e. sulfonic sulfur contents greater than 5% by weight) are needed for solubility in complex fertilizers with pH less than 2.0. In fact, it is the increased solubility gained by sulfoalkylation that is the main advantage of this invention. Unlike earlier sulfonation processes, the sulfoalkylation process described here produces humic acids which have sufficient sulfoalkylation for solubility in complex, low pH fertilizers.

EXAMPLE 3

The following example illustrates how the process can be used to prepare mixed salts of humic acid. Leonardite was mixed with 14% formaldehyde, 20% soldium meta-bisulfite and 20% potassium meta-bisulfite. The pH of the mixture was then adjusted to 11.0 with potassium hydroxide, and the pH adjusted mixture was cooked at 165° C. for 2 hours. After removal of insolubles, the resulting product had a sulfonic sulfur content of 5.2%, a precipitation pH less than 0.5 and excellent solubility in both 14.7-4.2-0-4 and 3-30-0-4 fertilizers.

It is expected that, like other humic acid extracts, the humic acid concentrates formed by the process described herein are beneficial to plant growth. When added to soil in even small amounts, such products are known to stimulate plant growth, enhance color and seed germination. They may also be used in combination with dry fertilizers, to soak and/or spray on seed prior to planting, and for making soil and/or foliar applied micronutrients.

While this disclosure details the preferred embodiment of the present invention, other embodiments of the invention may be devised without departing from the basic intent of this disclosure, the full scope of which is determined by the following claims.

TABLE 1

EFFECT OF FORMALDEHYDE AND SODIUM meta-BISULFITE CHARGES ON YIELDS, SULFONIC SULFUR CONTENTS AND PRECIPITATION pH OF ACID SOLUBLE HUMIC ACIDS

| $CH_2O$ Charge (%) | $Na_2S_2O_5$ Charge (%) | Sulfonic Sulfur (%) | Yield, % | Precipitation pH |
|---|---|---|---|---|
| 0 | 0 | 0 | 76 | 4.5 |
| 6 | 15 | 2.9 | 76 | 1.5 |
| 9 | 20 | 3.4 | 78 | 1 |
| 12 | 28 | 4.5 | 78 | 0.5 |
| 16 | 33 | 5.3 | 80 | <0.5 |

TABLE 2

EFFECT OF SULFOALKYLATION ON SOLUBILITY OF HUMIC ACIDS IN LOW pH FERTILIZERS

| | | % Insolubles | |
|---|---|---|---|
| % Sodium Bisulfite | Sulfonic Sulfur, % | Fertilizer #1 14.9-4.2-0-4 (pH 1.5) | Fertilizer 190 2 3-30-0-4 (pH 0.5) |
| 0 | 0 | 15 | 20 |
| 15 | 2.9 | 10 | 12 |
| 20 | 3.4 | 8 | 10 |
| 28 | 4.5 | 6 | 8 |
| 33 | 5.3 | 1 | 1 |

Note: % Insolubles determined by mixing 1 gram of humic acid in 50 grams of fertilizer solution and measuring % DeLaval sludge

We claim:

1. A method for producing sulfoalkylated humic acid concentrates, comprising the steps of:
   (a) mixing a humic acid containing ore with an aldehyde and a sulfonating agent to form a slurry;
   (b) adjusting the pH of said slurry to pH 9–12 to form a reaction mixture;
   (c) reacting said pH adjusted reaction mixture under conditions of temperature and pressure and for sufficient time to produce a sulfoalkylated humic acid concentrate, said sulfoalkylated humic acid concentrate having a sulfonic sulfur content greater than about 5% and having a precipitation pH below pH 0.5; and
   (d) separating the sulfoalkylated humic acid concentrate from the reaction mixture.

2. The method of claim 1 wherein said humic acid containing ore is selected from lignites, brown coals, peats and mixtures thereof.

3. The method of claim 1 wherein said humic acid containing ore is leonardite.

4. The method of claim 1 wherein said sulfonating agent is selected from sodium bisulfite, potassium bisulfite, ammonium bisulfite, sodium meta-bisulfite, potassium meta-bisulfite, ammonium meta-bisulfite, and mixtures thereof.

5. The method of claim 1 wherein said slurry contains a minimum of about 15% by weight aldehyde.

6. The method of claim 1 wherein said slurry contains a minimum of about 30% by weight sulfonating agent.

7. The method of claim 1 wherein said step of adjusting the pH of the slurry comprises adding an alkali to said slurry.

8. The method of claim 7 wherein said alkali is selected from sodium hydroxide, potassium hydroxide, ammonium hydroxide, lithium hydroxide, sodium carbonate, potassium carbonate, lithium carbonate and mixtures thereof.

9. The method of claim 1 wherein said reaction mixture is reacted at a temperature of from 100°–210° C.

10. The method of claim 1 wherein said reaction mixture is reacted for about 0.5–5 hours.

11. The method of claim 1 wherein the pH of the reaction mixture is adjusted to pH 10–11.

12. The method of claim 1 further including the step of forming the sulfoalkylated humic acid concentrate into a powder form.

13. The method of claim 1 wherein said aldehyde is selected from formaldehyde, acetaldehyde, propionaldehyde, butyl aldehyde and mixtures thereof.

14. A method for producing sulfoalkylated humic acid concentrates, comprising the steps of:
   (a) mixing a humic acid containing ore with a minimum of 15% formaldehyde and 30% of a sulfonating agent to form a slurry;
   (b) adjusting the pH of the resulting slurry to pH 10–11 to form a reaction mixture;
   (c) reacting said pH adjusted reaction mixture at 160°–170° C. for at least about one hour to produce a sulfoalkylated humic acid concentrate, said sulfoalkylated humic acid concentrate having a sulfonic sulfur content greater than about 5% and having a precipitation pH below pH 0.5; and
   (d) separating the sulfoalkylated humic acid concentrate from the reaction mixture.

15. The method of claim 14 wherein said humic acid containing ore is selected from lignites, brown coals, peats and mixtures thereof.

16. The method of claim 14 wherein said humic acid containing ore is leonardite.

17. The method of claim 14 wherein said sulfonating agent is selected from sodium bisulfite, potassium bisulfite, ammonium bisulfite, sodium meta-bisulfite, potassium meta-bisulfite, ammonium meta-bisulfite, and mixtures thereof.

18. The method of claim 14 wherein said step of adjusting the pH of the slurry comprises adding an alkali to said slurry.

19. The method of claim 18 wherein said alkali is selected from sodium hydroxide, potassium hydroxide, ammonium hydroxide, lithium hydroxide, sodium carbonate, potassium carbonate, lithium carbonate and mixtures thereof.

20. The method of claim 14 further including the step of forming the sulfoalkylated humic acid concentrate into a powder form.

* * * * *